US012302082B2

(12) United States Patent
Samuelsson et al.

(10) Patent No.: US 12,302,082 B2
(45) **Date of Patent: *May 13, 2025**

(54) BINAURAL DIALOGUE ENHANCEMENT

(71) Applicants: Dolby Laboratories Licensing Corporation, San Francisco, CA (US); DOLBY INTERNATIONAL AB, Dublin (IE)

(72) Inventors: Leif Jonas Samuelsson, Sundbyberg (SE); Dirk Jeroen Breebaart, Ultimo (AU); David Matthew Cooper, Carlton (AU); Jeroen Koppens, Nederweert (NL)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,040

(22) Filed: Mar. 15, 2024

(65) Prior Publication Data

US 2024/0406650 A1 Dec. 5, 2024

Related U.S. Application Data

(63) Continuation of application No. 18/309,099, filed on Apr. 28, 2023, now Pat. No. 11,950,078, which is a
(Continued)

(30) Foreign Application Priority Data

Jan. 29, 2016 (EP) .................................... 16153468

(51) Int. Cl.
*H04S 1/00* (2006.01)
*H04R 5/04* (2006.01)
(Continued)

(52) U.S. Cl.
CPC ............... *H04S 1/002* (2013.01); *H04R 5/04* (2013.01); *H04S 3/00* (2013.01); *H04S 7/303* (2013.01);
(Continued)

(58) Field of Classification Search
CPC . H04S 1/002; H04S 3/00; H04S 7/303; H04S 3/008; H04S 3/02; H04S 2420/01; H04S 2420/03; H04R 5/04
See application file for complete search history.

(56) References Cited

U.S. PATENT DOCUMENTS

| | | | |
|---|---|---|---|
| 8,315,396 | B2 | 11/2012 | Schreiner |
| 2008/0049943 | A1 | 2/2008 | Faller |

(Continued)

FOREIGN PATENT DOCUMENTS

| | | |
|---|---|---|
| CN | 101356573 | 1/2009 |
| CN | 101933344 | 12/2010 |

(Continued)

OTHER PUBLICATIONS

Breebaart, J. et al "Spectral and Spatial Parameter Resolution Requirements for Parametric, Filter-Bank-Based HRTF Processing" JAES vol. 58 Issue 3, pp. 126-140, Mar. 2010.

(Continued)

*Primary Examiner* — David L Ton

(57) ABSTRACT

Methods for dialogue enhancing audio content, comprising providing a first audio signal presentation of the audio components, providing a second audio signal presentation, receiving a set of dialogue estimation parameters configured to enable estimation of dialogue components from the first audio signal presentation, applying said set of dialogue estimation parameters to said first audio signal presentation, to form a dialogue presentation of the dialogue components; and combining the dialogue presentation with said second
(Continued)

audio signal presentation to form a dialogue enhanced audio signal presentation for reproduction on the second audio reproduction system, wherein at least one of said first and second audio signal presentation is a binaural audio signal presentation.

14 Claims, 7 Drawing Sheets

Related U.S. Application Data continuation of application No. 17/465,733, filed on Sep. 2, 2021, now Pat. No. 11,641,560, which is a continuation of application No. 16/915,670, filed on Jun. 29, 2020, now Pat. No. 11,115,768, which is a continuation of application No. 16/532,143, filed on Aug. 5, 2019, now Pat. No. 10,701,502, which is a continuation of application No. 16/073,149, filed as application No. PCT/US2017/015165 on Jan. 26, 2017, now Pat. No. 10,375,496.

(60) Provisional application No. 62/288,590, filed on Jan. 29, 2016.

(51) Int. Cl.
*H04S 3/00* (2006.01)
*H04S 3/02* (2006.01)
*H04S 7/00* (2006.01)

(52) U.S. Cl.
CPC ................. *H04S 3/008* (2013.01); *H04S 3/02* (2013.01); *H04S 2420/01* (2013.01); *H04S 2420/03* (2013.01)

(56) References Cited

U.S. PATENT DOCUMENTS

| | | | |
|---|---|---|---|
| 2008/0056517 | A1 | 3/2008 | Algazi |
| 2008/0201369 | A1 | 8/2008 | Cordoba |
| 2014/0133683 | A1 | 5/2014 | Robinson |
| 2015/0348564 | A1 | 12/2015 | Paulus et al. |
| 2016/0225387 | A1 | 8/2016 | Koppens |
| 2017/0309288 | A1 | 10/2017 | Koppens |
| 2018/0233156 | A1 | 8/2018 | Breebaart et al. |

FOREIGN PATENT DOCUMENTS

| | | | |
|---|---|---|---|
| CN | 102113315 | | 6/2011 |
| CN | 102362471 | | 2/2012 |
| CN | 102687536 | | 9/2012 |
| CN | 103226952 | A | 7/2013 |
| CN | 101518098 | B | 10/2013 |
| CN | 103650539 | | 3/2014 |
| CN | 104078050 | | 10/2014 |
| CN | 105144287 | | 12/2015 |
| CN | 105229733 | | 1/2016 |
| EP | 2070389 | | 6/2009 |
| JP | 2003522472 | | 7/2003 |
| JP | 2010515290 | A | 5/2010 |
| JP | 2015530823 | A | 10/2015 |
| JP | 2015530825 | A | 10/2015 |
| WO | 2015031505 | A1 | 3/2015 |
| WO | 2017/035281 | | 3/2017 |

OTHER PUBLICATIONS

Dressler Roger, “Dolby Surround Pro Logic II Decoder Principles of Operation” published in 2000.

Geiger, J. et al “Dialogue Enhancement of Stereo Sound” 23rd European Signal Processing Conference, pp. 874-878, 2015.

Paulus, J. et al “MPEG-D Spatial Audio Object Coding for Dialogue Enhancement (SAOC-DE)” AES Convention 138, May 2015.

Wightman, F. et al “Sound Localization” Human Psychophysics, Springer New York, 1993, pp. 155-192.

Zhang et al., “Unsupervised Speech Pattern Extraction Based on Speech Recognition and Feature,” China Academic Journal Electronic Publishing House, Computer Engineering, vol. 40, No. 5, May 2014, pp. 262-265.

BINAURAL DIALOGUE ENHANCEMENT

CROSS-REFERENCE TO RELATED APPLICATIONS

The present application is a continuation of U.S. patent application Ser. No. 18/309,099 filed Apr. 28, 2023, which is a continuation of U.S. patent application Ser. No. 17/465,733 filed Sep. 2, 2021, now U.S. Pat. No. 11,641,560 issued May 2, 2023, which is a continuation of U.S. patent application Ser. No. 16/915,670 filed Jun. 29, 2020, now U.S. Pat. No. 11,115,678 issued Sep. 7, 2021, which is a continuation of U.S. patent application Ser. No. 16/532,143 filed Aug. 5, 2019, now U.S. Pat. No. 10,701,502 issued Jun. 30, 2020, which is a continuation of U.S. patent application Ser. No. 16/073,149 filed Jul. 26, 2018, now U.S. Pat. No. 10,375,496 issued Aug. 6, 2019, which is the U.S. national stage of International Patent Application No. PCT/US2017/015165 filed Jan. 26, 2017, which claims priority to U.S. Provisional Patent Application No. 62/288,590 filed Jan. 29, 2016, and European Patent Application No. 16153468.0 filed Jan. 29, 2016, all of which are incorporated herein by reference in their entirety.

FIELD OF THE INVENTION

The present invention relates to the field of audio signal processing, and discloses methods and systems for efficient estimation of dialogue components, in particular for audio signals having spatialization components, sometimes referred to as immersive audio content.

BACKGROUND OF THE INVENTION

Any discussion of the background art throughout the specification should in no way be considered as an admission that such art is widely known or forms part of common general knowledge in the field.

Content creation, coding, distribution and reproduction of audio are traditionally performed in a channel based format, that is, one specific target playback system is envisioned for content throughout the content ecosystem. Examples of such target playback systems audio formats are mono, stereo, 5.1, 7.1, and the like, and we refer to these formats as different presentations of the original content. The above mentioned presentations are typically played back over loudspeakers but a notable exception is the stereo presentation which also commonly is played back directly over headphones.

One specific presentation is the binaural presentation, typically targeting playback on headphones. Distinctive to a binaural presentation is that it is a two-channel signal with each signal representing the content as perceived at, or close to, the left and right eardrum respectively. A binaural presentation can be played back directly over loudspeakers, but preferably the binaural presentation is transformed into a presentation suitable for playback over loudspeakers using cross-talk cancellation techniques.

Different audio reproduction systems have been introduced above, like loudspeakers in different configurations, for example stereo, 5.1, and 7.1, and headphones. It is understood from the examples above that a presentation of the original content has a natural, intended, associated audio reproduction system, but can of course be played back on a different audio reproduction system.

If content is to be reproduced on a different playback system than the intended one, a downmixing or upmixing process can be applied. For example, 5.1 content can be reproduced over a stereo playback system by employing specific downmix equations. Another example is playback of stereo encoded content over a 7.1 speaker setup, which may comprise a so-called upmixing process, that could or could not be guided by information present in the stereo signal. A system capable of upmixing is Dolby Pro Logic from Dolby Laboratories Inc (Roger Dressler, "Dolby Pro Logic Surround Decoder, Principles of Operation", www.Dolby.com).

An alternative audio format system is an audio object format such as that provided by the Dolby Atmos system. In this type of format, objects or components are defined to have a particular location around a listener, which may be time varying. Audio content in this format is sometimes referred to as immersive audio content. It is noted that within the context of this application an audio object format is not considered a presentation as described above, but rather a format of the original content that is rendered to one or more presentations in an encoder, after which the presentation(s) is encoded and transmitted to a decoder.

When multi-channel and object based content is to be transformed into a binaural presentation as mentioned above, the acoustic scene consisting of loudspeakers and objects at particular locations is simulated by means of head-related impulse responses (HRIRs), or binaural room impulse responses (BRIRs), which simulate the acoustical pathway from each loudspeaker/object to the ear drums, in an anechoic or echoic (simulated) environment, respectively. In particular, audio signals can be convolved with HRIRs or BRIRs to re-instate inter-aural level differences (ILDs), inter-aural time differences (ITDs) and spectral cues that allow the listener to determine the location of each individual loudspeaker/object. The simulation of an acoustic environment (reverberation) also helps to achieve a certain perceived distance. FIG. 1 illustrates a schematic overview of the processing flow for rendering two object or channel signals $x_i$ 10, 11, being read out of a content store 12 for processing by 4 HRIRs e.g. 14. The HRIR outputs are then summed 15, 16, for each channel signal, so as to produce headphone speaker outputs for playback to a listener via headphones 18. The basic principle of HRIRs is, for example, explained in Wightman, Frederic L., and Doris J. Kistler. "Sound localization." Human psychophysics. Springer New York, 1993. 155-192.

The HRIR/BRIR convolution approach comes with several drawbacks, one of them being the substantial amount of convolution processing that is required for headphone playback. The HRIR or BRIR convolution needs to be applied for every input object or channel separately, and hence complexity typically grows linearly with the number of channels or objects. As headphones are often used in conjunction with battery-powered portable devices, a high computational complexity is not desirable as it may substantially shorten battery life. Moreover, with the introduction of object-based audio content, which may comprise say more than 100 objects active simultaneously, the complexity of HRIR convolution can be substantially higher than for traditional channel-based content.

For this purpose, co-pending and non-published U.S. Provisional Patent Application Ser. No. 62/209,735, filed Aug. 25, 2015, describes a dual-ended approach for presentation transformations that can be used to efficiently transmit and decode immersive audio for headphones. The coding efficiency and decoding complexity reduction are achieved by splitting the rendering process across encoder and decoder, rather than relying on the decoder alone to render all objects.

A part of the content which during creation is associated with a specific spatial location is referred to as an audio component. The spatial location can be a point in space or a distributed location. Audio components can be thought of as all the individual audio sources that a sound artist mixes, i.e., positions spatially, into a soundtrack. Typically a semantic meaning (e.g. dialogue) is assigned to the components of interest so that the goal of the processing (e.g. dialogue enhancement) becomes defined. It is noted that audio components that are produced during content creation are typically present throughout the processing chain, from the original content to different presentations. For example, in an object format there can be dialogue objects with associated spatial locations. And in a stereo presentation there can be dialogue components that are spatially located in the horizontal plane.

In some applications, it is desirable to extract dialogue components in the audio signal, in order to e.g. enhance or amplify such components. The goal of dialogue enhancement (DE) may be to modify the speech part of a piece of content that contains a mix of speech and background audio so that the speech becomes more intelligible and/or less fatiguing for an end-user. Another use of DE is to attenuate dialogue that for example is perceived as disturbing by an end-user. There are two fundamental classes of DE methods: encoder side and decoder side DE. Decoder side DE (called single ended) operates solely on the decoded parameters and signals that reconstruct the non-enhanced audio, i.e., no dedicated side-information for DE is present in the bitstream. In encoder side DE (called dual ended), dedicated side-information that can be used to do DE in the decoder is computed in the encoder and inserted in the bitstream.

FIG. 2 shows an example of dual ended dialogue enhancement in a conventional stereo example. Here, dedicated parameters 21 are computed in the encoder 20 that enable extraction of the dialogue 22 from the decoded non-enhanced stereo signal 23 in the decoder 24. The extracted dialogue is level modified, e.g. boosted 25 (by an amount partially controlled by the end-user) and added to the non-enhanced output 23 to form the final output 26. The dedicated parameters 21 can be extracted blindly from the non-enhanced audio 27 or exploit a separately provided dialogue signal 28 in the parameter computations.

Another approach is disclosed in U.S. Pat. No. 8,315,396. Here, the bitstream to the decoder includes an object downmix signal (e.g. a stereo presentation), object parameters to enable reconstruction of the audio objects, and object based metadata allowing manipulation of the reconstructed audio objects. As indicated in FIG. 10 of U.S. Pat. No. 8,315,396, the manipulation may include amplification of speech related objects. This approach thus requires the reconstruction of the original audio objects on the decoder side, which typically is computationally demanding.

There is a general desire to provide dialogue estimation efficiently also in a binaural context.

SUMMARY OF THE INVENTION

It is an object of the invention to provide efficient dialogue enhancement in a binaural context, i.e. when at least one of the audio presentations that the dialogue component(s) is extracted from, or the audio presentation to which the extracted dialogue is added to, is a (echoic or anechoic) binaural representation.

In accordance with a first aspect of the present invention, there is provided a method for dialogue enhancing audio content having one or more audio components, wherein each component is associated with a spatial location, comprising providing a first audio signal presentation of the audio components intended for reproduction on a first audio reproduction system, providing a second audio signal presentation of the audio components intended for reproduction on a second audio reproduction system, receiving a set of dialogue estimation parameters configured to enable estimation of dialogue components from the first audio signal presentation, applying the set of dialogue estimation parameters to the first audio signal presentation, to form a dialogue presentation of the dialogue components; and combining the dialogue presentation with the second audio signal presentation to form a dialogue enhanced audio signal presentation for reproduction on the second audio reproduction system, wherein at least one of the first and second audio signal presentation is a binaural audio signal presentation.

In accordance with a second aspect of the present invention, there is provided a method for dialogue enhancing audio content having one or more audio components, wherein each component is associated with a spatial location, comprising receiving a first audio signal presentation of the audio components intended for reproduction on a first audio reproduction system, receiving a set of presentation transform parameters configured to enable transformation of the first audio signal presentation into a second audio signal presentation intended for reproduction on a second audio reproduction system, receiving a set of dialogue estimation parameters configured to enable estimation of dialogue components from the first audio signal presentation, applying the set of presentation transform parameters to the first audio signal presentation to form a second audio signal presentation, applying the set of dialogue estimation parameters to the first audio signal presentation to form a dialogue presentation of the dialogue components; and combining the dialogue presentation with the second audio signal presentation to form a dialogue enhanced audio signal presentation for reproduction on the second audio reproduction system, wherein only one of the first audio signal presentation and the second audio signal presentation is a binaural audio signal presentation.

In accordance with a third aspect of the present invention, there is provided a method for dialogue enhancing audio content having one or more audio components, wherein each component is associated with a spatial location, comprising receiving a first audio signal presentation of the audio components intended for reproduction on a first audio reproduction system, receiving a set of presentation transform parameters configured to enable transformation of the first audio signal presentation into the second audio signal presentation intended for reproduction on a second audio reproduction system, receiving a set of dialogue estimation parameters configured to enable estimation of dialogue components from the second audio signal presentation, applying the set of presentation transform parameters to the first audio signal presentation to form a second audio signal presentation, applying the set of dialogue estimation parameters to the second audio signal presentation to form a dialogue presentation of the dialogue components; and summing the dialogue presentation with the second audio signal presentation to form a dialogue enhanced audio signal presentation for reproduction on the second audio reproduction system, wherein only one of the first audio signal presentation and the second audio signal presentation is a binaural audio signal presentation.

In accordance with a fourth aspect of the present invention, there is provided a decoder for dialogue enhancing audio content having one or more audio components, wherein each component is associated with a spatial location, comprising, a core decoder for receiving and decoding a first audio signal presentation of the audio components intended for reproduction on a first audio reproduction system and a set of dialogue estimation parameters configured to enable estimation of dialogue components from the first audio signal presentation, a dialogue estimator for applying the set of dialogue estimation parameters to the first audio signal presentation, to form a dialogue presentation of the dialogue components, and means for combining the dialogue presentation with the second audio signal presentation to form a dialogue enhanced audio signal presentation for reproduction on the second audio reproduction system, wherein only one of the first and second audio signal presentation is a binaural audio signal presentation.

In accordance with a fifth aspect of the present invention, there is provided a decoder for dialogue enhancing audio content having one or more audio components, wherein each component is associated with a spatial location, comprising a core decoder for receiving a first audio signal presentation of the audio components intended for reproduction on a first audio reproduction system, a set of presentation transform parameters configured to enable transformation of the first audio signal presentation into a second audio signal presentation intended for reproduction on a second audio reproduction system, and a set of dialogue estimation parameters configured to enable estimation of dialogue components from the first audio signal presentation, a transform unit configured to apply the set of presentation transform parameters to the first audio signal presentation to form a second audio signal presentation intended for reproduction on a second audio reproduction system, a dialogue estimator for applying the set of dialogue estimation parameters to the first audio signal presentation to form a dialogue presentation of the dialogue components, and means for combining the dialogue presentation with the second audio signal presentation to form a dialogue enhanced audio signal presentation for reproduction on the second audio reproduction system, wherein only one of the first audio signal presentation and the second audio signal presentation is a binaural audio signal presentation.

In accordance with a sixth aspect of the present invention, there is provided a decoder for dialogue enhancing audio content having one or more audio components, wherein each component is associated with a spatial location, comprising a core decoder for receiving a first audio signal presentation of the audio components intended for reproduction on a first audio reproduction system, a set of presentation transform parameters configured to enable transformation of the first audio signal presentation into a second audio signal presentation intended for reproduction on a second audio reproduction system, and a set of dialogue estimation parameters configured to enable estimation of dialogue components from the first audio signal presentation, a transform unit configured to apply the set of presentation transform parameters to the first audio signal presentation to form a second audio signal presentation intended for reproduction on a second audio reproduction system, a dialogue estimator for applying the set of dialogue estimation parameters to the second audio signal presentation to form a dialogue presentation of the dialogue components, and a summation block for summing the dialogue presentation with the second audio signal presentation to form a dialogue enhanced audio signal presentation for reproduction on the second audio reproduction system, wherein one of the first audio signal presentation and the second audio signal presentation is a binaural audio signal presentation.

The invention is based on the insight that a dedicated parameter set may provide an efficient way to extract a dialogue presentation from one audio signal presentation which may then be combined with another audio signal presentation, where at least one of the presentations is a binaural presentation. It is noted that according to the invention, it is not necessary to reconstruct the original audio objects in order to enhance dialogue. Instead, the dedicated parameters are applied directly on a presentation of the audio objects, e.g. a binaural presentation, a stereo presentation, etc. The inventive concept enables a variety of specific embodiments, each with specific advantages.

It is noted that the expression "dialogue enhancement" here is not restricted to amplifying or boosting dialogue components, but may also relate to attenuation of selected dialogue components. Thus, in general the expression "dialogue enhancement" refers to a level-modification of one or more dialogue related components of the audio content. The gain factor G of the level modification may be less than zero in order to attenuate dialogue, or greater than zero in order to enhance dialogue.

In some embodiments, the first and second presentations are both (echoic or anechoic) binaural presentations. In case only one of them binaural, the other presentation may be a stereo or surround audio signal presentation.

In the case of different presentations, the dialogue estimation parameters may be configured to also perform a presentation transform, so that the dialogue presentation corresponds to the second audio signal presentation.

The invention may advantageously be implemented in a particular type of a so called simulcast system, where the encoded bit stream also includes a set of transform parameters suitable for transforming the first audio signal presentation to a second audio signal presentation.

BRIEF DESCRIPTION OF THE DRAWINGS

Embodiments of the invention will now be described, by way of example only, with reference to the accompanying drawings in which.

DETAILED DESCRIPTION

Figure 1:
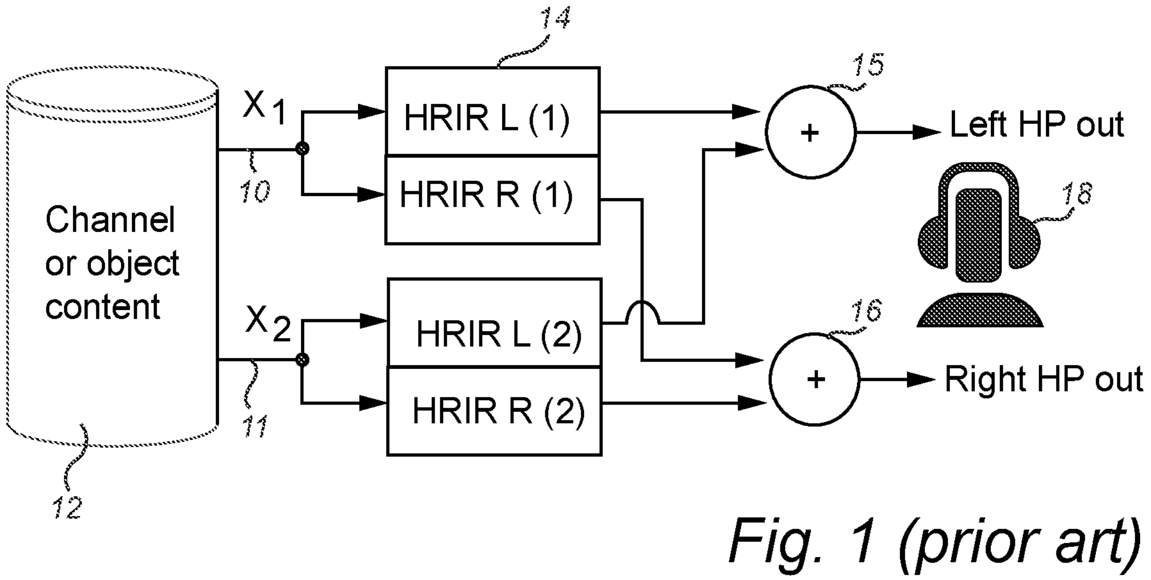
Fig. 1 (prior art)
FIG. 1 illustrates a schematic overview of the HRIR convolution process for two sound sources or objects, with each channel or object being processed by a pair of HRIRs/BRIRs.

Systems and methods disclosed in the following may be implemented as software, firmware, hardware or a combination thereof. In a hardware implementation, the division of tasks referred to as "stages" in the below description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various ways to implement embodiments of the invention will be discussed with reference to FIGS. 3-6. All these embodiments generally relate to a system and method for applying dialogue enhancement to an input audio signal having one or more audio components, wherein each component is associated with a spatial location. The illustrated blocks are typically implemented in a decoder.

In the presented embodiments the input signals are preferably analyzed in time/frequency tiles, for example by means of a filter bank such as a quadrature mirror filter (QMF) bank, a discrete Fourier transform (DFT), a discrete cosine transform (DCT), or any other means to split input signals into a variety of frequency bands. The result of such a transform is that an input signal $x_i[n]$ for input with index i and discrete-time index n is represented by sub-band signals $x_i[b,k]$ for time slot (or frame) k and sub-band b. Consider for example the estimation of the binaural dialogue presentation from a stereo presentation. Let $x_j[b,k]$, j=1,2 denote the sub-band signals of the left and right stereo channels, and $\hat{d}_i[b,k]$, i=1, 2 denote the sub-band signals of the estimated left and right binaural dialogue signals. The dialogue estimate may be computed like $$\hat{d}_i[b,k]=\sum_{m=0}^{M-1}\sum_{j=1}^{J} w_{ijm}^{B_p,K}x_j[b,k-m],\ i=1,2,\ b\in B_p,\ k\in K,\ p=1,\ldots,P$$

with $B_p$, K sets of frequency (b) and time (k) indices corresponding to a desired time/frequency tile, p the parameter band index, and m a convolution tap index, and $w_{ijm}^{B_p,K}$ a matrix coefficient belonging to input index j, parameter band $B_p$, sample range or time slot K, output index i, and convolution tap index m. Using the above formulation, the dialogue is parameterized by the parameters w (relative to the stereo signal; J=2 in this case of a stereo signal). The number of time slots in the set K can be independent of, and constant with respect to frequency and is typically chosen to correspond to a time interval of 5-40 ms. The number P of sets of frequency indices is typically between 1-25 with the number of frequency indices in each set typically increasing with increasing frequency to reflect properties of hearing (higher frequency resolution in the parameterization toward low frequencies).

The dialogue parameters w may be computed in the encoder, and encoded using techniques disclosed in U.S. Provisional Patent Application Ser. No. 62/209,735, filed Aug. 25, 2015, hereby incorporated by reference. The parameters w are then transmitted in the bitstream and decoded by a decoder prior to application using the above equation. Due to the linear nature of the estimate the encoder computation can be implemented using minimum mean squared error (MMSE) methods in cases where the target signal (the clean dialogue or an estimate of the clean dialogue) is available.

The choice of P, and the choice of the number of time slots in K is a trade-off between quality and bit rate. Furthermore, the parameters w can be constrained in order to lower the bit rate (at the cost of lower quality), e.g., by assuming $w_{ijm}^{B_p,K}=0$ when i≠j and simply not transmitting those parameters. The choice of M is also a quality/bitrate trade-off, see U.S. patent application 62/209,742 filed on Aug. 25, 2015, hereby incorporated by reference. The parameters w are in general complex valued since the binauralization of the signals introduces ITDs (phase differences). However, the parameters can be constrained to be real-valued in order to lower the bit rate. Furthermore, it is well-known that humans are insensitive to phase and time differences between the signals in the left and right ear above a certain frequency, the phase/magnitude cut-off frequency, around 1.5-2 kHz, thus above that frequency, binaural processing is typically done so that no phase difference is introduced between the left and right binaural signals, and hence parameters can be real-valued with no loss in quality (cf. Breebaart, J., Nater, F., Kohlrausch, A. (2010). Spectral and spatial parameter resolution requirements for parametric, filter-bank-based HRTF processing. J. Audio Eng. Soc., 58 No 3, p. 126-140). The above quality/bit rate trade-offs can be done independently in each time/frequency tile.

In general it is proposed to use estimators of the form $$\hat{y}_i[b,k]=\sum_{m=0}^{M-1}\sum_{j=1}^{J}w_{ijm}^{B_p,K}x_j[b,k-m],$$

$$i=1,\ldots,I,\ b\in B_p,\ k\in K,\ p=1,\ldots,P$$

where at least one of ŷ and x is a binaural signal, i.e., I=2 or J=2 or I=J=2. For notational convenience we will in the following often omit the time/frequency tile indexing $B_p$,K as well as the i, j, m indexing when referring to different parameter sets used to estimate dialogue.

The above estimator can conveniently be expressed in matrix notation as (omitting the time/frequency tile indexing for ease of notation)

$$\hat{Y}=\sum_{m=0}^{M-1}X_mW_m$$

where $X_m=[x_1(m)\ \ldots\ x_J(m)]$ and $\hat{Y}=[\hat{y}_1\ \ldots\ \hat{y}_I]$ contain vectorized versions of $x_j[b,k-m]$ and $\hat{y}_i[b,k]$ respectively in the columns, and $W_m$ is a parameter matrix with J rows and I columns. The above form of the estimator may be used when performing only dialogue extraction, or when performing only a presentation transform, as well as in the case where both extraction and presentation transform is done using a single set of parameters as is detailed in embodiments below.

Figure 3:
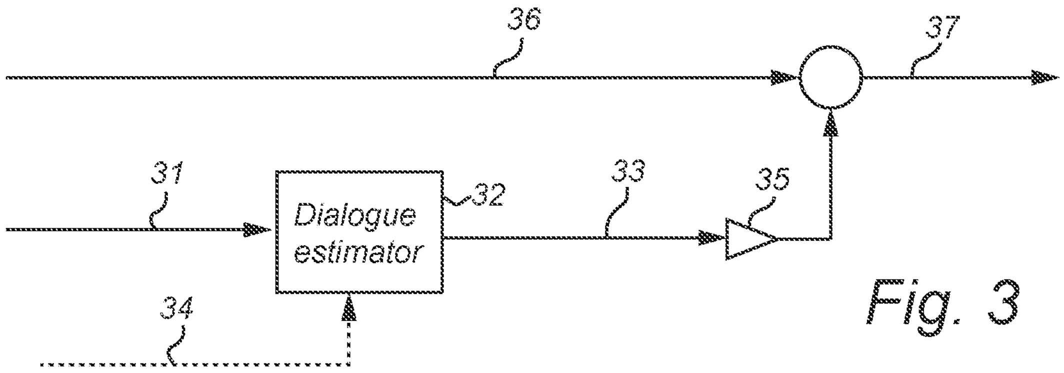
FIG. 3 is a schematic block diagram illustrating the principle of dialogue enhancement according to the invention.

With reference to FIG. 3, a first audio signal presentation 31 has been rendered from an immersive audio signal including a plurality of spatialized audio components. This first audio signal presentation is provided to a dialogue estimator 32, in order to provide a presentation 33 of one or several extracted dialogue components. The dialogue estimator 32 is provided with a dedicated set of dialogue estimation parameters 34. The dialogue presentation is level modified (e.g. boosted) by gain block 35, and then combined with a second presentation 36 of the audio signal to form a dialogue enhanced output 37. As will be discussed below, the combination may be a simple summation, but may also involve a summation of the dialogue presentation with the first presentation, before applying a transform to the sum, thereby forming the dialogue enhanced second presentation.

According to the present invention, at least one of the presentations is a binaural presentation (echoic or anechoic). As will be further discussed in the following, the first and second presentations may be different, and the dialogue presentation may or may not correspond to the second presentation. For example, the first audio signal presentation may be intended for playback on a first audio reproduction system, e.g. a set of loudspeakers, while the second audio signal presentation may be intended for playback on a second audio reproduction system, e.g. headphones.

Single Presentation

Figure 4:
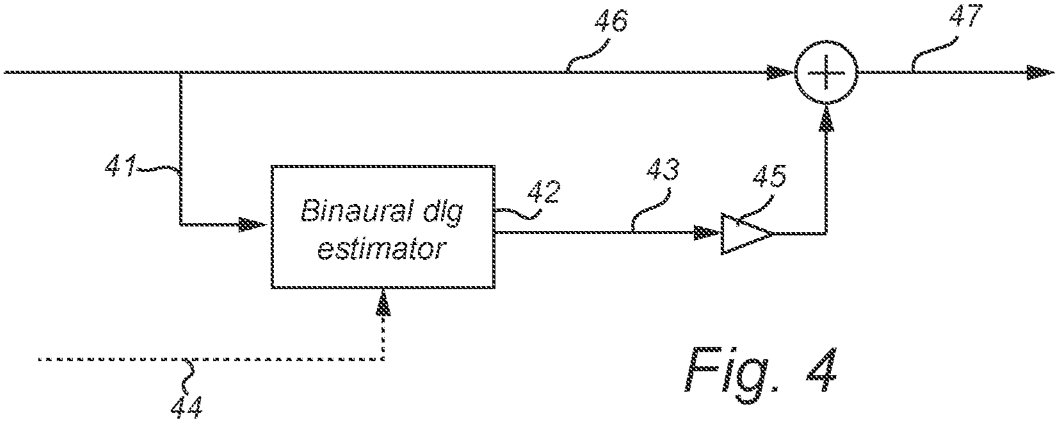
FIG. 4 is a schematic block diagram of single presentation dialogue enhancement according to an embodiment of the invention.

In the decoder embodiment in FIG. 4, the first and second presentations 41, 46, as well as the dialogue presentation 43, are all (echoic or anechoic) binaural presentations. The (binaural) dialogue estimator 42—and the dedicated parameters 44—is thus configured to estimate binaural dialogue components which are level modified in block 45 and added to the second audio presentation 46 to form output 47.

In the embodiment in FIG. 4, the parameters 44 are not configured to perform any presentation transform. Still, for best quality, the binaural dialogue estimator 42 should be complex valued in frequency bands up to the phase/magnitude cut-off frequency. To explain why complex valued estimators can be needed even when no presentation transform is done consider estimation of binaural dialogue from a binaural signal that is a mix of binaural dialogue and other binaural background content. Optimal extraction of dialogue often includes subtracting portions of say the right binaural signal from the left binaural signal to cancel background content. Since the binaural processing, by nature, introduces time (phase) differences between left and right signals, those phase differences must be compensated for prior to any subtraction can be done, and such compensation requires complex valued parameters. Indeed, when studying the result of MMSE computation of parameters the parameters in general come out as complex valued if not constrained to be real valued. In practice the choice of complex vs real valued parameters is a trade-off between quality and bit rate. As mentioned above, parameters can be real-valued above the frequency phase/magnitude cut-off frequency without any loss in quality by exploiting the insensitivity to fine-structure waveform phase differences at high frequencies.

Two Presentations

Figure 5:
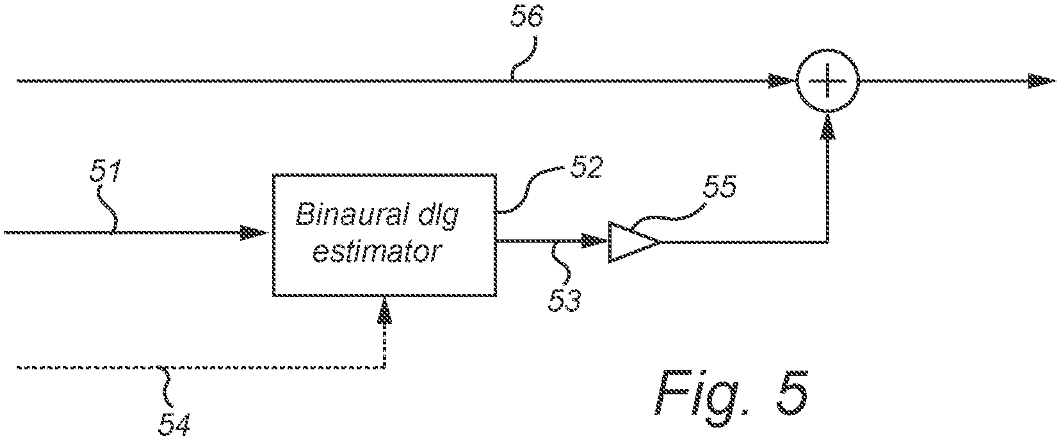
FIG. 5 is a schematic block diagram of two presentation dialogue enhancement according to a further embodiment of the invention.

In the decoder embodiment in FIG. 5, the first and second presentations are different. In the illustrated example, the first presentation 51 is a non-binaural presentation (e.g. stereo 2.0, or surround 5.1), while the second presentation 56 is a binaural presentation. In this case, the set of dialogue estimation parameters 54 are configured to allow the binaural dialogue estimator 52 to estimate a binaural dialogue presentation 53 from a non-binaural presentation 51. It is noted that the presentations could be reversed, in which case the binaural dialogue estimator would e.g. estimate a stereo dialogue presentation from a binaural audio presentation. In either case, the dialogue estimator needs to extract dialogue components and perform a presentation transform. The binaural dialogue presentation 53 is level modified by block 55 and added to the second presentation 56.

Figure 2:
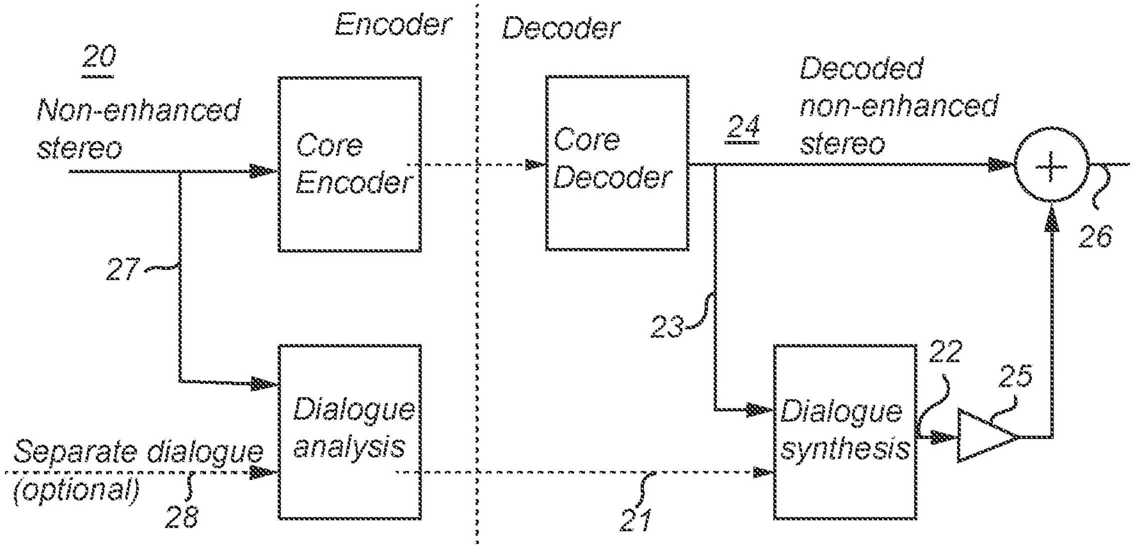
Fig. 2 (prior art)
FIG. 2 illustrates schematically dialogue enhancement in a stereo context.
Figure 6:
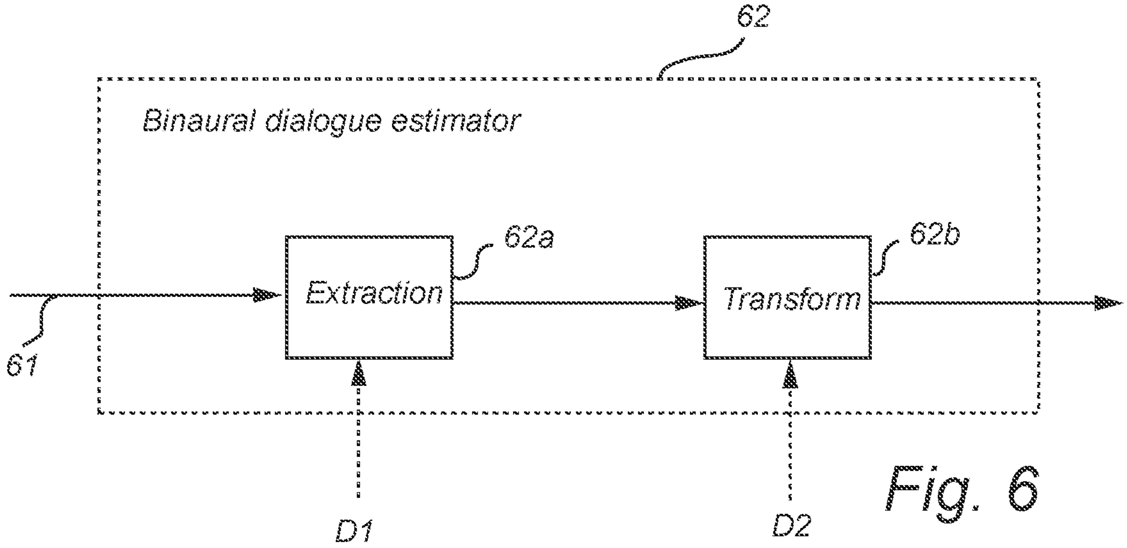
FIG. 6 is a schematic block diagram of the binaural dialogue estimator in FIG. 5 according to a further embodiment of the invention.

As indicated in FIG. 5, the binaural dialogue estimator 52 receives one single set of parameters 54, configured to perform the two operations of dialogue extraction and presentation transform. However, as indicated in FIG. 6, it is also possible that an (echoic or anechoic) binaural dialogue estimator 62 receives two sets of parameters D1, D2; one set (D1) configured to extract dialogue (dialogue extraction parameters) and one set (D2) configured to perform the dialogue presentation transform (dialogue transform parameters). This may be advantageous in an implementation where one or both of these subsets D1, D2 are already available in the decoder. For example, the dialogue extraction parameters D1 may be available for conventional dialogue extraction as illustrated in FIG. 2. Further, the parameter transform parameters D2 may be available in a simulcast implementation, as discussed below.

In FIG. 6, the dialogue extraction (block 62*a*) is indicated as occurring before the presentation transform (block 62*b*), but this order may of course equally well be reversed. It is also noted that for reasons of computational efficiency, even if the parameters are provided as two separate sets D1, D2, it may be advantageous to first combine the two sets of parameters into one combined matrix transform, before applying this combined transform to the input signal 61.

Further, it is noted that the dialogue extraction can be one dimensional, such that the extracted dialogue is a mono representation. The transform parameters D2 are then positional metadata, and the presentation transform comprises rendering the mono dialogue using HRTFs, HRIRs or BRIRs corresponding to the position. Alternatively, if the desired rendered dialogue presentation is intended for loudspeaker playback, the mono dialogue could be rendered using loudspeaker rendering techniques such as amplitude panning or vector-based amplitude panning (VBAP).

Simulcast Implementation

FIGS. 7-11 show embodiments of the present invention in the context of a simulcast system, i.e. a system where one audio presentation is encoded and transmitted to a decoder together with a set of transform parameters which enable the decoder to transform the audio presentation into a different presentation adapted to the intended playback system (e.g. as indicated a binaural presentation for headphones). Various aspects of such a system is described in detail in co-pending and non-published U.S. Provisional Patent Application Ser. No. 62/209,735, filed Aug. 25, 2015, hereby incorporated by reference. For simplicity, FIGS. 7-11 only illustrate the decoder side.

Figure 7:
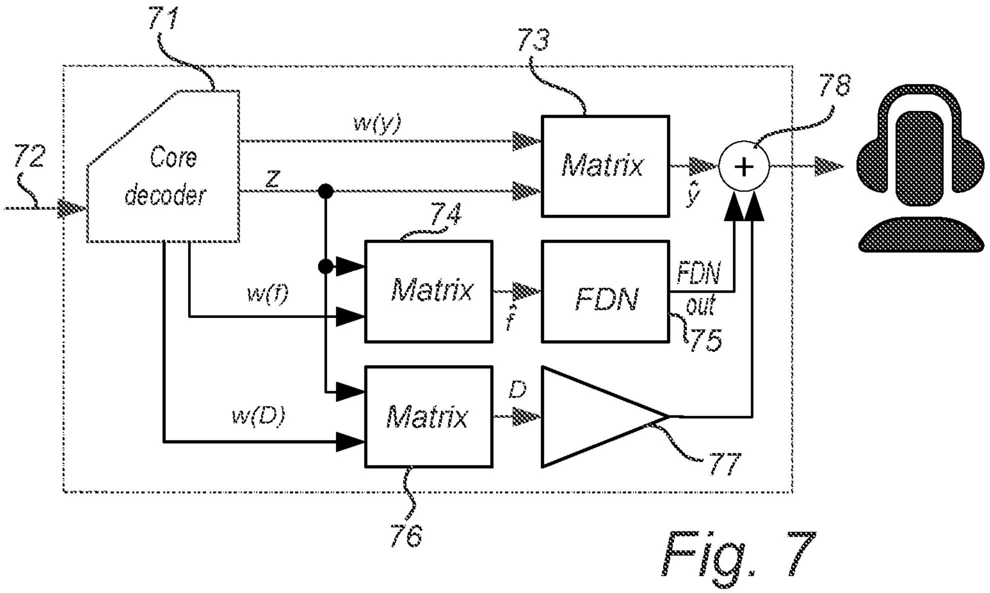
FIG. 7 is a schematic block diagram of a simulcast decoder implementing dialogue enhancement according to an embodiment of the invention.

As illustrated in FIG. 7, a core decoder 71 receives an encoded bitstream 72 including an initial audio signal presentation of the audio components. In the illustrated case this initial presentation is a stereo presentation z, but it may also be any other presentation. The bitstream 72 also includes a set of presentation transform parameters w(y) which are used as matrix coefficients to perform a matrix transform 73 of the stereo signal z to generate a reconstructed anechoic binaural signal $\hat{y}$. The transform parameters w(y) have been determined in the encoder as discussed in U.S. 62/209,735. In the illustrated case, the bitstream 72 also includes a set of parameters w(f) which are used as matrix coefficients to perform a matrix transform 74 of the stereo signal z to generate a reconstructed input signal $\hat{f}$ for an acoustic environment simulation, here a feedback delay network (FDN) 75. These parameters w(f) have been determined in a similar way as the presentation transform parameters w(y). The FDN 75 receives the input signal $\hat{f}$ and provides an acoustic environment simulation output $FDN_{out}$ which may be combined with the anechoic binaural signal $\hat{y}$ to provide an echoic binaural signal.

In the embodiment in FIG. 7, the bitstream further includes a set of dialogue estimation parameters w(D) which are used as matrix coefficients in a dialogue estimator 76 to perform a matrix transform of the stereo signal z to generate an anechoic binaural dialogue presentation D. The dialogue presentation D is level modified (e.g. boosted) in block 77, and combined with the reconstructed anechoic signal $\hat{y}$ and the acoustic environment simulation output $FDN_{out}$ in summation block 78.

FIG. 7 is essentially an implementation of the embodiment in FIG. 5 in a simulcast context.

Figure 8:
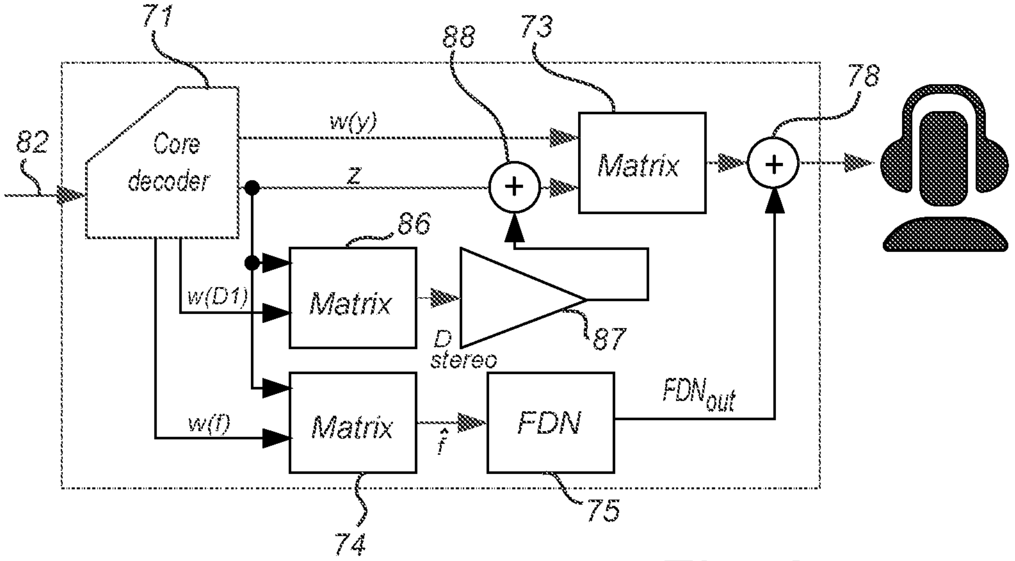
FIG. 8 is a schematic block diagram of a simulcast decoder implementing dialogue enhancement according to another embodiment of the invention.

In the embodiment in FIG. 8, a stereo signal z, a set of transform parameters w(y) and a further set of parameters w(f) are received and decoded just as in FIG. 7, and elements 71, 73, 74, 75, and 78 are equivalent to those discussed with respect to FIG. 7. Further, the bitstream 82 here also includes a set of dialogue estimation parameters w(D1) which are applied by a dialogue estimator 86 on the signal z. However, in this embodiment, the dialogue estimation parameters w(D1) are not configured to provide any presentation transform. The dialogue presentation output $D_{stereo}$ from the dialogue estimator 86 therefore corresponds to the initial audio signal presentation, here a stereo presentation. This dialogue presentation $D_{stereo}$ is level modified in block 87, and then added to the signal z in the summation 88. The dialogue enhanced signal ($z+D_{stereo}$) is then transformed by the set of transform parameters w(y).

FIG. 8 can be seen as an implementation of the embodiment in FIG. 6 in a simulcast context, where w(D1) is used as D1 and w(y) is used as D2. However, while in FIG. 6 both sets of parameters are applied in the dialogue estimator 62, in FIG. 8 the extracted dialogue $D_{stereo}$ is added to the signal z and the transform w(y) is applied to the combined signal (z+D).

Figure 9A:
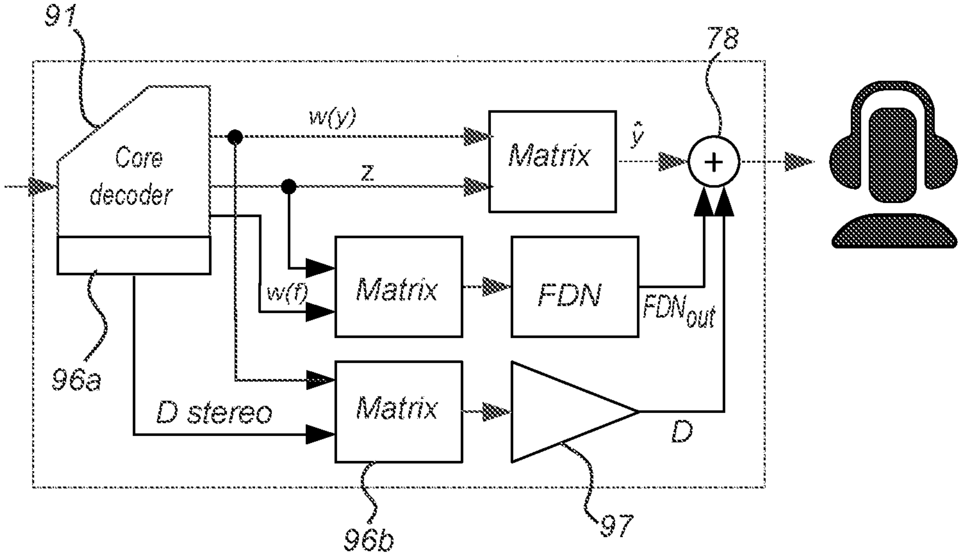
FIG. 9*a* is a schematic block diagram of a simulcast decoder implementing dialogue enhancement according to yet another embodiment of the invention.

It is noted that the set of parameters w(D1) may be identical to the dialogue enhancement parameters used to provide dialogue enhancement of the stereo signal in a simulcast implementation. This alternative is illustrated in FIG. 9*a*, where the dialogue extraction 96*a* is indicated as forming part of the core decoder 91. Further, in FIG. 9*a*, a presentation transform 96*b* using the parameter set w(y) is performed before the gain, separately from the transformation of the signal z. This embodiment is thus even more similar to the case shown in FIG. 6, with the dialogue estimator 62 comprising both transforms 96*a*, 96*b*.

Figure 9B:
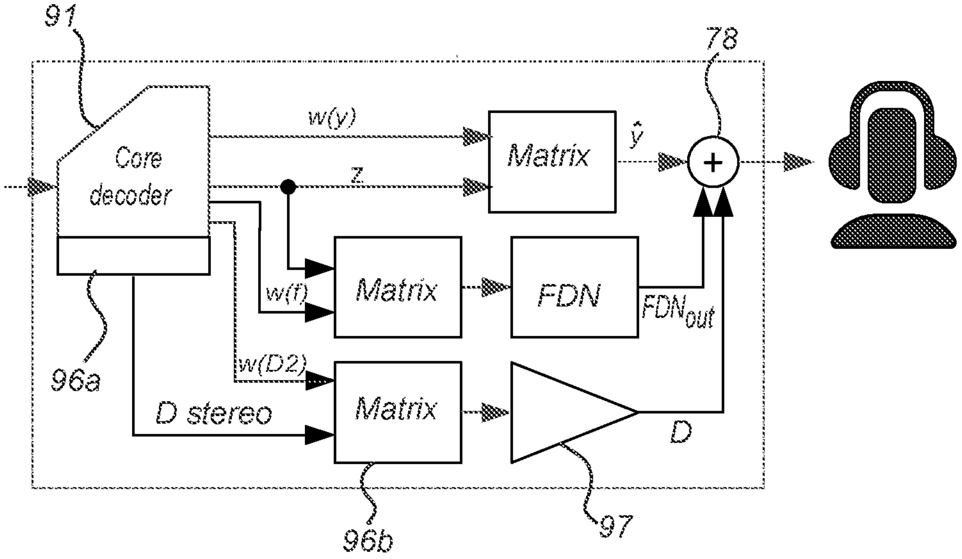
FIG. 9*b* is a schematic block diagram of a simulcast decoder implementing dialogue enhancement according to yet another embodiment of the invention.

FIG. 9*b* shows a modified version of the embodiment in FIG. 9*a*. In this case the presentation transform is not performed using the parameter set w(y), but with an additional set of parameters w(D2) which is provided in a part of the bitstream dedicated to binaural dialogue estimation.

In one embodiment, the aforementioned dedicated presentation transform w(D2) in FIG. 9*b* is a real-valued, single-tap (M=1), full-band (P=1) matrix.

Figure 10:
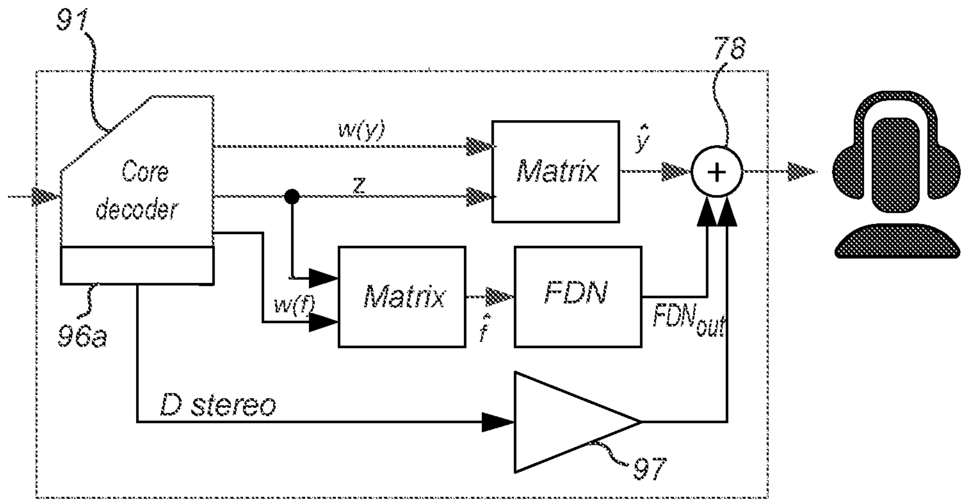
FIG. 10 is a schematic block diagram of a simulcast decoder implementing dialogue enhancement according to yet another embodiment of the invention.

FIG. 10 shows a modified version of the embodiment in FIG. 9*a*-9*b*. In this case, the dialogue extractor 96*a* again provides a stereo dialogue presentation $D_{stereo}$, and is again indicated as forming part of the core decoder 91. Here, however, the stereo dialogue presentation $D_{stereo}$, after level modification in block 97, is added directly to the anechoic binaural signal f (together with the acoustic environment simulation from the FDN).

It is noted that combining signals with different presentations, e.g., summing a stereo dialogue signal to a binaural signal (which contains non-enhanced binaural dialogue components) naturally leads to spatial imaging artifacts since the non-enhanced binaural dialogue components are perceived to be spatially different compared to a stereo presentation of the same components.

It is further noted that combining signals with different presentations can lead to constructive summing of dialogue components in certain frequency bands, and destructive summing in other frequency bands. The reason for this is that binaural processing introduces ITDs (phase differences) and we are summing signals that are in-phase in certain frequency bands and out-of-phase in other bands, leading to coloring artifacts in the dialogue components (moreover the coloring can be different in the left and right ear). In one embodiment, phase differences above the phase/magnitude cut-off frequency are avoided in the binaural processing so as to reduce this type of artifact.

As a final note to the case of combining signals with different presentations it is acknowledged that in general, binaural processing can reduce the intelligibility of dialogue. In cases where the goal of dialogue enhancement is to maximize intelligibility, it may be advantageous to extract and level modify (e.g. boost) a dialogue signal that is non-binaural. To elaborate further, even if the final presentation intended for playback is binaural, it may be advantageous in such a case to extract and level modify (e.g. boost) a stereo dialogue signal and combine that with the binaural presentation (trading off coloring artifacts and spatial imaging artifacts as described above, for increased intelligibility).

Figure 11:
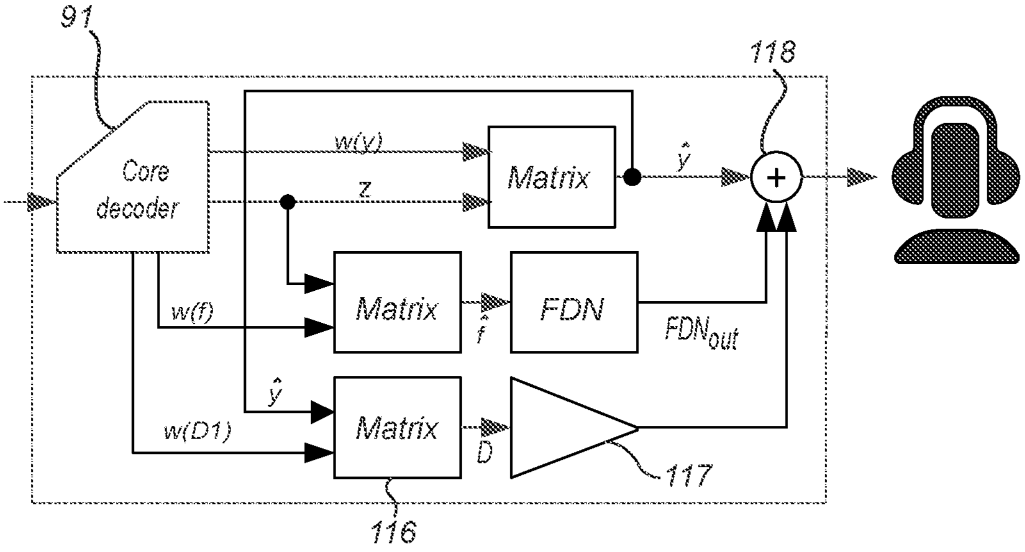
FIG. 11 is a schematic block diagram of a simulcast decoder implementing dialogue enhancement according to yet another embodiment of the invention.

In the embodiment in FIG. 11, a stereo signal z, a set of transform parameters w(y) and a further set of parameters w(f) are received and decoded just as in FIG. 7. Further, similar to FIG. 8, the bitstream also includes a set of dialogue estimation parameters w(D1) which are not configured to provide any presentation transform. However, in this embodiment, the dialogue estimation parameters w(D1) are applied by the dialogue estimator 116 on the reconstructed anechoic binaural signal ŷ to provide an anechoic binaural dialogue presentation D. This dialogue presentation D is level modified by a block 117 and added in summation 118 to the signal ŷ together with $FDN_{out}$.

FIG. 11 is essentially an implementation of the single presentation embodiment in FIG. 5 in a simulcast context. However, it can also be seen as an implementation of FIG. 6 with a reversed order of D1 and D2, where again w(D1) is used as D1 and w(y) is used as D2. However, while in FIG. 6 both sets of parameters are applied in the dialogue estimator, in FIG. 9 the transform parameters D2 have already been applied in order to obtain ŷ, and the dialogue estimator 116 only needs to apply the parameters w(D1) to the signal ŷ in order to obtain the echoic binaural dialogue presentation D.

In some applications, it may be desirable to apply different processing depending on the desired value of the dialogue level modification factor G. In one embodiment, example, appropriate processing is selected based on a determination of whether the factor G is greater than or smaller than a given threshold. Of course, there may also be more than one threshold, and more than one alternative processing. For example, a first processing when G<th1, a second processing when th1<=G<th2, and a third processing when G>=th2, where th1 and th2 are two given threshold values.

Figure 12:
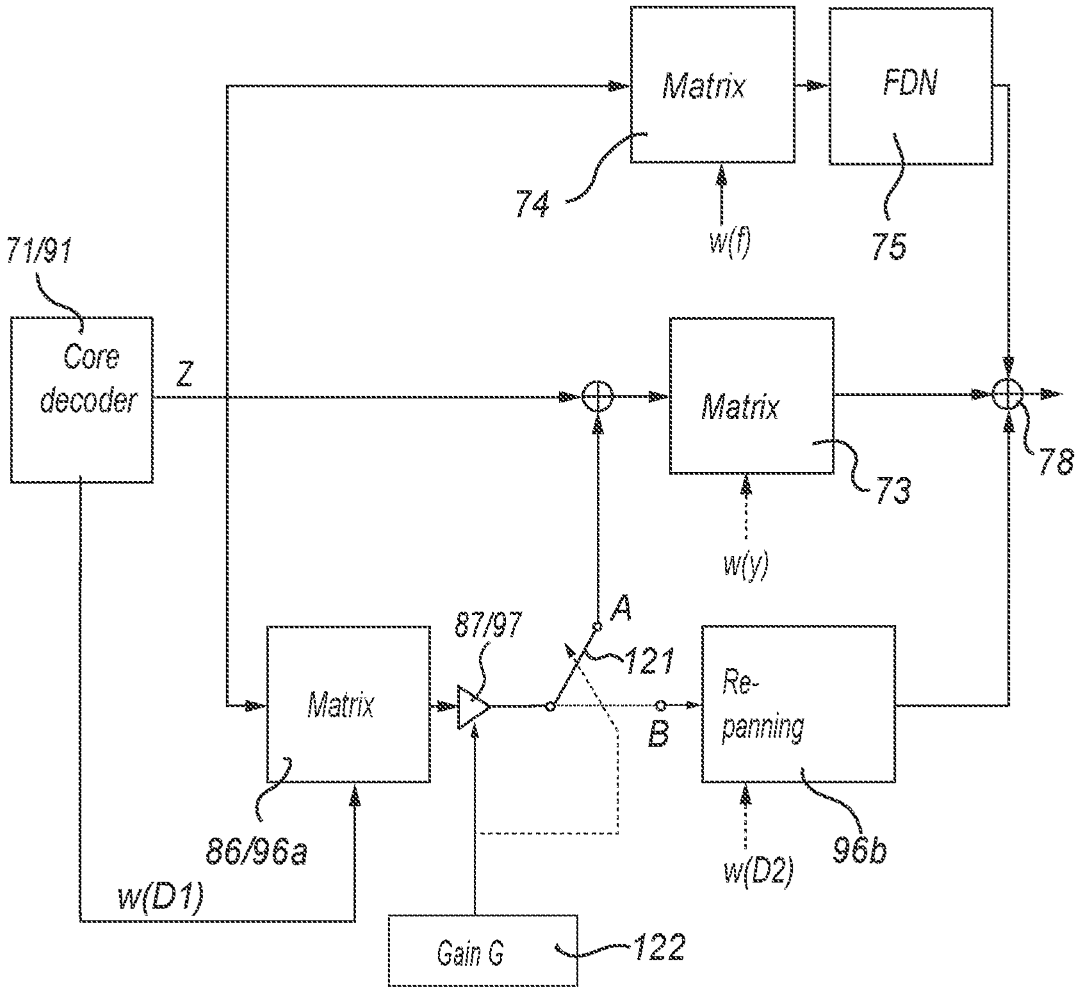
FIG. 12 is a schematic block diagram showing yet another embodiment of the present invention.

In a specific example, illustrated in FIG. 12, the threshold is zero, and first processing is applied when G<0 (attenuation of dialogue), while a second processing is applied when G>0 (enhancement of dialogue). For this purpose, the circuit in FIG. 12 includes selection logic in the form of a switch 121 with two positions A and B. The switch is provided with the value of the gain factor G from block 122, and is configured to assume position A when G<0, and position B when G>0.

When the switch is in position A, the circuit is here configured to combine the estimated stereo dialogue from matrix transform 86 with the stereo signal z, and then perform the matrix transform 73 on the combined signal to generate a reconstructed anechoic binaural signal. The output from the feedback delay network 75 is then combined with this signal in 78. It is noted that this processing essentially corresponds to FIG. 8 discussed above.

When the switch is in position B, the circuit is here configured to apply transform parameters w(D2) to the stereo dialogue from matrix transform 86 in order to provide a binaural dialogue estimation. This estimation is then added to the anechoic binaural signal from transform 73, and output from the feedback delay network 75. It is noted that this processing essentially corresponds to FIG. 9*b* discussed above.

The skilled person will realize many other alternatives for the processing in position A and B, respectively. For example, the processing when the switch is in position B could instead correspond to that in FIG. 10. However, the main contribution of the embodiment in FIG. 12 is the introduction of the switch 121, which enables alternative processing depending on the value of the gain factor G.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for processing immersive audio content having one or more audio components for dialogue enhancement, wherein each audio component is associated with a spatial location, the method comprising:

obtaining a first audio signal presentation of the audio components intended for reproduction on a first audio reproduction system;

obtaining a set of presentation transform parameters configured to enable transformation of said first audio signal presentation into said second audio signal presentation intended for reproduction on a second audio reproduction system;

obtaining a set of dialogue estimation parameters configured to enable estimation of dialogue components from the first audio signal presentation;

transforming the first audio signal presentation to form the second audio signal presentation based on the set of presentation transform parameters;

forming an acoustic environment simulation input signal based on the first audio signal presentation;

applying an acoustic environment simulation to the acoustic environment simulation input signal to generate an acoustic environment simulation output signal;

applying the set of dialogue estimation parameters to the first audio signal presentation to form a dialogue presentation of the dialogue components; and summing the dialogue presentation with the second audio signal presentation and the acoustic environment simulation output signal to form a dialogue enhanced audio signal presentation for reproduction on the second audio reproduction system;

wherein the second audio signal presentation is a binaural audio signal presentation.

2. The method according to claim 1, wherein the first audio signal presentation is a multi-channel stereo or surround audio signal presentation.

3. The method according to claim 1, wherein the second audio signal presentation is an anechoic or echoic binaural audio signal presentation.

4. The method according to claim 1, wherein the set of presentation transform parameters include parameters to enable transformation of said first audio signal presentation into an acoustic environment simulation input signal.

5. The method according to claim 1, wherein the simulation of the acoustic environment includes simulation of reverberation.

6. The method according to claim 1, wherein the acoustic environment simulation input signal corresponds to the first audio signal presentation.

7. The method according to claim 1, further comprising receiving a set of dialogue transform parameters and applying the set of dialogue transform parameters before or after application of said set of dialogue estimation parameters to form a transformed dialogue presentation corresponding to the second audio signal presentation.

8. The method according to claim 1, wherein said dialogue estimation parameters are configured to also perform a presentation transform, so that the dialogue presentation corresponds to the second audio signal presentation.

9. The method according to claim 1, further comprising applying a level modification by a factor G to the dialogue presentation.

10. The method according to claim 9, wherein a first processing is applied when G is less than a given threshold, and a second processing is applied when G is greater than said threshold.

11. The method according to claim 10, wherein the threshold is equal to zero, wherein $G<0$ represents attenuation of dialogue and $G>0$ represents enhancement of dialogue.

12. The method according to claim 1, wherein the dialogue presentation is a mono presentation, and further comprising:

receiving positional data related to said dialogue components, rendering the mono dialogue presentation using the positional data before combining with the second audio signal presentation.

13. The method according to claim 12, wherein the rendering includes either:

selecting head related transfer functions (HRTFs) from a library based on the positional data, and applying the selected HRTFs to the mono dialogue presentation; or amplitude panning.

14. A non-transitory computer-readable storage medium comprising a set of instructions, wherein, when executed by one or more processors of an audio signal processing device, the instructions cause the one or more processors to perform the method of claim 1.

* * * * *